United States Patent Office 3,383,221
Patented May 14, 1968

3,383,221
EGG COMPOSITIONS CONTAINING SOLUBLE PHOSPHOROUS COMPOUNDS EFFECTIVE TO IMPART FRESH EGG COLOR
Richard G. L. Chin, North Brunswick, N.J., and Sutton Redfern, White Plains, N.Y., assignors to Standard Brands Incorporated, New York, N.Y., a corporation of Delaware
No Drawing. Continuation-in-part of applications Ser. No. 347,692, Feb. 27, 1964, and Ser. No. 546,526, May 2, 1966. This application Oct. 4, 1967, Ser. No. 678,767
18 Claims. (Cl. 99—161)

ABSTRACT OF THE DISCLOSURE

Small amounts of soluble phosphorous compounds in egg yolks and egg whites prevent the eggs from undergoing a color change on storage from their characteristic orange-yellow color to a muddy brown. This color change is observable in both liquid eggs and scrambled eggs. In the case of liquid eggs the pH of the same should be maintained within the range of 5.5 to 7. The pH of liquid eggs from which scrambled eggs are prepared, on the other hand, may vary over a wider range; for instance, where the phosphorous compound is monosodium phosphate a pH of up to about 8 will prevent the scrambled eggs from undergoing a substantial color change.

---

This application is a continuation in part of our application Ser. No. 347,692, filed Feb. 27, 1964 (now abandoned), and our application Ser. No. 546,526, filed May 2, 1966, now abandoned.

This invention relates to egg compositions and to methods of preparing the same.

When freshly shelled eggs are allowed to stand, either at room temperature or under refrigeration for a short period of time, their attractive orange-yellow color changes to a muddy or a pale brown. This color change does not affect the flavor or palatability of the eggs but does detract from the appetite appeal thereof.

When eggs which have undergone this color change are used, for instance, in preparing scrambled eggs, the muddy or pale brown color is imparted to the scrambled eggs. This color change also takes place when scrambled eggs made from freshly shelled eggs are allowed to stand for a time, for instance, on steam tables in restaurants.

It is an object of the present invention to provide an egg composition comprising egg white and egg yolk which may be stored for relatively long periods of time without undergoing the normal color change to a muddy or pale brown.

A further object of the present invention is to provide a liquid egg composition comprising egg white and egg yolk which may be stored for relatively long periods of time without undergoing the normal color change to a muddy or pale brown.

A still further object of the present invention is to provide a scrambled egg composition comprising egg white and egg yolk which may be stored for relatively long periods of time without undergoing the normal color change to a muddy or pale brown.

The above enumerate objects, as well as the other objects, together with the advantages of this invention, will readily be comprehended by persons skilled in the art upon reference to the following description.

These objects are attained in accordance with the present invention by providing an egg composition comprising a mixture of egg white and egg yolk which turns a muddy or pale brown on storage, and a small amount of a soluble phosphorous compound effective to impart a fresh egg-like color to said composition but insufficient to substantially affect the normal coagulation characteristics of the composition.

The term "egg composition" is used in this description and the appended claims to include both scrambled eggs and liquid eggs which includes freshly shelled eggs, eggs which have turned a muddy brown, whole eggs, and pasteurized eggs.

When the egg white portion of freshly shelled eggs is substantially completely separated from the egg yolk portion, little or no color change is observed in the latter on standing but as the proportion of egg whites to egg yolks is increased the color change accordingly increases.

The liquid egg composition of the present invention may be produced by incorporating into a mixture of egg white and egg yolk an acid of phosphorous or an acid salt thereof in an amount sufficient to adjust the pH to a value from about 5.5 to about 7. The composition may also be prepared by incorporating a neutral or basic salt of an acid of phosphorous and a sufficient amount of an edible acid to adjust the pH of the composition to the range indicated above, i.e. 5.5 to 7. The phosphorous compound should be distributed uniformly throughout the egg compositions to avoid reduction of the pH in any portion of the composition below about 5.5 since coagulation of the egg protein will occur at this pH.

The amount of phosphorous compound necessary to impart the fresh egg-like color to the liquid egg composition depends on a number of variables, for instance, the chemical composition of the phosphorous compound, i.e., whether it is an ortho-, pyro-, or tri-phosphoric acid or a corresponding salt thereof, the pH of the eggs, the particular color desired, and, if necessary, the amount of edible acid added to the egg composition. However, the amount used should be insufficient to substantially affect the taste, the coagulation characteristics, and the bacterial decomposition of the eggs.

The fresh egg-like color of the egg composition of the present varies slightly, for instance, yellow with an orange tinge, bright yellow, orange-yellow and various shades thereof. Although these colors, except the orange-yellow color, are not the exact color of fresh egg compositions, they closely resemble the same and are considered superior to the muddy or pale brown color of stored eggs which do not contain the phosphorous compounds, and are acceptable for purposes of this invention. The orange-yellow color is considered herein to be substantially the same as the characteristic color of fresh egg compositions and for the purposes of this invention is considered to be the best or most desirable color produced. The description fresh egg-like color is used in this description and the appended claims to include these colors and to delineate the color of the egg composition of the present invention from the muddy or pale brown color of untreated stored egg compositions.

Generally, only a very small amount of a phosphorous compound is necessary. For example, to impart the desirable color to the liquid egg compositions of the present invention, the preferred proportions of phosphate salts are about 0.3 to 0.7 percent by weight in the case of anhydrous monosodium phosphate, about 0.3 to about 0.4 percent by weight in the case of sodium acid pyrophosphate and about 0.3 to about 0.4 percent by weight in the case of monocalcium phosphate. The most preferred proportion of anhydrous monosodium phosphate is about 0.5 percent. When ortho-phosphoric acid is used, the most desirable color is produced when sufficient amount of this acid is incorporated in the eggs to adjust the pH of the same to a range from about 6.4 to about 6.6.

If liquid egg compositions which have undergone the color change to muddy brown or pale brown are treated in accordance with this invention, their original fresh egg-like color is essentially restored. This reversible effect seems to indicate that the microorganisms naturally present in liquid eggs are not responsible for the muddy or pale brown color change.

The scrambled egg composition of the present invention may be prepared from the above enumerated liquid egg compositions or from liquid eggs containing a phosphorous compound and having a pH above 7. While such liquid eggs having a pH higher than about 7 will not have the desired color stability and in some instances may be an undesirable muddy or pale brown, scrambled eggs prepared therefrom will have the fresh egg-like color of scrambled eggs prepared from freshly shelled eggs. Preferably the pH of the liquid eggs is the range of from about 5.5 to about 8.25 when the phosphorous compound employed is monosodium phosphate, from about 5.5 to about 7.5 when the phosphorous compound is sodium hexametaphosphate, and from about 5.5 to about 7.7 when the phosphorous compound is sodium tripolyphosphate.

Suitable phosphorous compounds are the ortho-, pyro-, and tri-phosphoric acids and their corresponding salts. The amounts of these additives used in preparing the scrambled egg composition of the present invention is dependent upon a number of variables; for instance, the kind of phosphorous compound used and the effect that these additives have on the textural characteristics of the scrambled eggs. For instance, when various phosphorous compounds are incorporated into liquid eggs and the pH of the eggs adjusted to undesirably high levels, the scrambled eggs. For instance, when various phosphorous mushy, pasty, gelatinous, and generally unappetizing as compared to scrambled eggs prepared from liquid eggs containing no additives. This textural limitation appears to be independent of imparting the fresh egg-like color to the scrambled egg composition of the present invention.

In the following table, it is generally shown that the kind of phosphate compound used in preparing scrambled eggs and the pH of the liquid eggs from which the scrambled eggs are prepared affects both the color and texture of the scrambled eggs.

| Phosphate Class | Scrambled Egg Color | Texture Limitation [1] |
| --- | --- | --- |
| Ortho- | Acceptable up to pH of about 8.25.[2] | pH above about 8.25. |
| Pyro- | Acceptable up to pH of about 9.[2] | pH above about 8.5. |
| Trilinear | Acceptable up to pH of about 9.[2] | pH above about 7.75. |
| Polylinear | Acceptable up to pH of about 7.25.[2] | pH above about 7.5. |
| Polycyclic | Acceptable up to pH of about 7.[2] | pH above about 7.25. |

[1] Indicates that at pH's higher than shown the scrambled eggs had undesirable textural characteristics.
[2] Indicates a color which is considered better than control egg samples containing no phosphorous compound.

The term "impart" is used in the description and the appended claims to include, preserving the fresh egg-like color of freshly shelled eggs, to restoring the fresh egg-like color to egg compositions whose color has changed to a muddy brown and to maintaining the fresh egg-like color of scrambled eggs.

In order to more clearly disclose the nature of the present invention, specific examples will hereinafter be described. It should be understood, however, that this is done solely by way of example and is intended to neither delineate the scope of the invention nor limit the ambit of the appended claims. The percentages indicated in the specification and claims are by weight.

In the following examples the color of the liquid egg composition and scrambled egg composition of the present invention are compared with control samples that were stored under various conditions. The color of the control samples were a muddy or a pale brown while the color of the egg compositions of the present invention were all judged to be superior to the control and similar to fresh egg compositions and had colors ranging from yellow with orange tinge to bright yellow to orange-yellow. These colors, for the purposes of the present invention, are considered to be a fresh egg-like color. The colors varied depending upon the kind of phosphorous compound used and the pH of the egg composition. In the examples the term "acceptable" is used to indicate egg colors which were better than the control while the term "unacceptable" is used to indicate that the color of the egg samples were substantially similar or worse than the control. The term "best" is used in the examples to indicate egg colors which are substantially the same as the characteristic orange-yellow color of freshly shelled liquid eggs or scrambled eggs prepared from freshly shelled liquid eggs.

Example I

This example illustrates the use of six acid phosphate salts for color stabilization of shelled liquid eggs.

A quantity of eggs was shelled and placed in stainless steel beaker. The yolks were broken by means of a stainless steel spatula. The eggs were pased through a screen and then blended to ensure substantial homogeneity. The blend was divided into eight portions, and with constant stirring small amounts of acid phosphate salts were added to seven of these portions. Monocalcium phosphate, because of its limited solubility, was added in a water slurry to provide better dispersion in the eggs. The eighth portion served as a control. All eight portions were refrigerated overnight and then allowed to stand at room temperature until they reached such temperature. The pH and color of the portions were as follows:

| Additive | Percent Additive In Egg Sample | pH After Refrigeration | Color After Refrigeration |
| --- | --- | --- | --- |
| None (control) | | 7.60 | Unacceptable. |
| Sodium Acid Pyrophosphate | 1.0 | 6.87 | Acceptable. |
| Monopotassium Phosphate | 1.0 | 6.53 | Best. |
| Monoammonium Phosphate | 1.0 | 6.52 | Do. |
| Monocalcium Phosphate Monohydrate | 0.3 | 6.45 | Do. |
| Monosodium Phosphate Monohydrate | 0.5 | 6.76 | Do. |
| Anhydrous Monosodium Phosphate | 0.43 | 6.65 | Do. |
| Sodium Hexametaphosphate (Calgon) | 0.75 | 6.93 | Acceptable. |

Example II

This example illustrates the use of monosodium phosphate monohydrate in various proportions in whole liquid eggs.

The egg samples were prepared in accordance with the procedure described in Example I and frozen and stored for six weeks. The samples were then allowed to stand at room temperature until they reached such temperature. The pH and color of the samples were as follows:

| Percent Monosodium Phosphate Monohydrate in Samples | pH | Color when Frozen for 6 Weeks |
| --- | --- | --- |
| 0 | 7.60 | Unacceptable. |
| 0.1 | 7.26 | Do. |
| 0.2 | 7.07 | Acceptable. |
| 0.3 | 6.92 | Best. |
| 0.4 | 6.85 | Do. |
| 0.5 | 6.76 | Do. |
| 0.6 | 6.70 | Do. |
| 0.7 | 6.65 | Do. |

Example III

This example illustrates the use of orthophosphoric acid (1 part 83.7% $H_3PO_4$ and 2 parts of water) in various proportions for stabilizing the color of whole eggs and scrambled eggs made from such treated whole eggs.

The egg samples were prepared in accordance with the procedure described in Example I. They were refrigerated overnight and then allowed to stand at room temperature until they reached such temperature. The pH and the color of each sample was noted. Scrambled eggs were then made from each sample and their color observed. The results were as follows:

| Amount of Orthophosphoric Acid in Egg Sample | pH | Color of Refrigerated Eggs | Color of Scrambled Eggs |
|---|---|---|---|
| None (control) | 7.45 | Unacceptable | Unacceptable. |
| 0.3 ml | 7.10 | Acceptable | Acceptable. |
| 0.6 ml | 6.80 | do | Do. |
| 0.8 ml | 6.60 | Best | Do. |
| 1.0 ml | 6.55 | do | Best. |
| 1.2 ml | 6.40 | do | Do. |
| 1.7 ml | 6.25 | Acceptable | Do. |
| 2.0 ml | 6.05 | do | Acceptable. |
| 3.3 ml | 5.60 | do | Do. |

Example IV

This example illustrates the use of an alkaline phosphate salt in combination with an edible acid for stabilizing the color of whole eggs.

The egg samples were prepared in accordance with the procedure described in Example I, the acid being added to a mixture of the eggs and phosphate salt. One set of samples was refrigerated overnight, and then allowed to stand at room temperature until they reached such temperature. Another set of samples was frozen for four days, and then allowed to stand at room temperature until they reached such temperature. The pH and color, observed after the samples reached room temperature, were as follows:

EGG SAMPLES

| Additive | pH Refrigerated Overnight | Color |
|---|---|---|
| None (control) | 7.50 | Unacceptable. |
| 1.0 percent $Na_2HPO_4 \cdot 7H_2O$ | 7.60 | Do. |
| 1.0 percent $Na_2PO_4 \cdot 7H_2O$ plus 0.21 percent citric acid. | 6.65 | Acceptable. |
| 1.0 percent $Na_2PO_4 \cdot 7H_2O$ plus 1N HCl.[1] | 6.70 | Do. |

[1] Amount sufficient to give indicated pH.

EGG SAMPLES

| Additive | pH Frozen 4 days | Color |
|---|---|---|
| Control | 7.45 | Unacceptable. |
| 1.0 percent $Na_2PO_4 \cdot 7H_2O$ | 7.42 | Do. |
| 1.0 percent $Na_2PO_4 \cdot 7H_2O$ plus 0.21 percent citric acid. | 6.60 | Best. |
| 1.0 percent $Na_2PO_4 \cdot 7H_2O$ plus 1N HCl.[1] | 6.60 | Do. |

[1] Amount sufficient to give indicated pH.

Example V

This example illustrates the use of anhydrous monosodium phosphate for restoring the characteristic orange-yellow color of fresh whole eggs to pasteurized whole eggs which have been stored frozen and the effect of the treatment on the color of scrambled eggs made therefrom.

To 250 grams of pasteurized whole eggs, which were stored frozen and then thawed, were added 1.125 grams of anhydrous monosodium phosphate and mixed for 10 to 15 minutes to insure even distribution of the monosodium phosphate throughout the eggs. One hundred grams of this product was scrambled and the color thereof compared with the color of a control sample of scrambled eggs. The treated scrambled eggs had a more orange-yellow color and did not darken as quickly as the control sample. Another 100 grams of the treated sample was refrigerated overnight and the color thereof compared with the color of a control sample. The color of the treated sample was restored to the orange-yellow color of fresh whole eggs while the control sample had a muddy brown color.

Example VI

This example illustrates that the small amounts of phosphorous compounds which are effective to impart fresh egg-like colors to egg compositions do not substantially affect the normal coagulation characteristics of the composition.

A quantity of whole eggs were treated according to Example I with 0.43 percent monosodium phosphate, 1.0 percent $K_2HPO_4$, 0.117 percent orthophosphoric acid, and 1.0 percent sodium acid pyrophosphate. These egg samples and a control sample containing no phosphorous compound were placed in a water bath maintained at 160° F. for 5 minutes and then observed for coagulation or formation of a precipitate. All the samples showed substantially the same degree of coagulation or substantially the same amount of precipitate formed.

Example VII

This example illustrates the effect of various phosphates on the color and texture of scrambled eggs.

A quantity of eggs were shelled and placed in a stainless steel beaker. The yolks were broken by means of a stainless steel spatula. The eggs were passed through a screen and then blended to insure substantial homogeneity. The blend was divided into various portions and various phosphate compounds and amounts indicated below were added with constant stirring of the samples. The samples were refrigerated overnight and then the pH of the samples were adjusted with either 1 N NaOH or 1 N HCl to the values shown below. The samples were frozen for 3 to 4 days and then thawed and the pH thereof determined. Scrambled eggs were prepared from the samples and after scrambling the eggs were allowed to stand at room temperature for about one half to one hour and the color and texture determined. The color and textural characteristics of these samples were compared with the color and textural characteristics of a control sample which was handled in the same manner but having no phosphorous compound therein. The results of this experiment are shown below.

TABLE I

| Phosphate Compound | pH Adjustments | pH After Thawing | Color of Scrambled Eggs | Texture |
|---|---|---|---|---|
| 0.3% Monosodium Phosphate Monohydrate. | [1] 6.8 | 7.05 | Acceptable | Good. |
|  | 7.25 | 7.40 | Best | Do. |
|  | 7.50 | 7.50 | do | Do. |
|  | 7.75 | 7.70 | do | Do. |
|  | 8.00 | 7.95 | Unacceptable | Watery, mushy, pasty, and gelatinous. |
|  | 8.25 | 8.20 | do | Do. |
|  | 8.50 | 8.35 | do | Do. |
|  | 9.00 | 8.75 | do | Do. |
| 0.5% Monosodium Phosphate Monohydrate. | [1] 6.7 | 6.85 | Best | Good. |
|  | 7.25 | 7.30 | do | Do. |
|  | 7.50 | 7.50 | do | Do. |
|  | 7.75 | 7.70 | Acceptable | Do. |
|  | 8.00 | 7.85 | do | Do. |
|  | 8.25 | 8.05 | do | Do. |
|  | 8.50 | 8.30 | Unacceptable | Watery, mushy, pasty, and gelatinous. |
|  | 9.00 | 8.60 | do | Do. |
| 0.7% Monosodium Phosphate Monohydrate. | [1] 6.6 | 6.65 | Best | Good. |
|  | 7.25 | 7.20 | do | Do. |
|  | 7.50 | 7.45 | do | Do. |
|  | 7.75 | 7.65 | do | Do. |
|  | 8.00 | 7.90 | do | Do. |
|  | 8.25 | 8.15 | Acceptable | Watery, mushy, pasty, and gelatinous. |
|  | 8.50 | 8.30 | Unacceptable | Do. |
|  | 9.00 | 8.70 | do | Do. |

[1] No adjustment.

TABLE II

| Phosphate Compound | pH Adjustments | pH After Thawing | Color of Scrambled Eggs | Texture |
|---|---|---|---|---|
| 0.5% Sodium Hexametaphosphate. | 6.7 | 7.04 | Acceptable | Good. |
|  | 7.25 | 7.56 | Unacceptable | Watery, mushy, pasty, and gelatinous |
|  | 7.50 | 7.74 | ....do.... | Do. |
|  | 7.75 | 7.93 | ....do.... | Do. |
|  | 8.00 | 8.12 | ....do.... | Do. |
|  | 8.50 | 8.52 | ....do.... | Do. |
|  | 9.00 | 8.80 | ....do.... | Do. |
| 0.3% Sodium Acid Pyrophosphate. | [1] 6.7 | 7.02 | Best | Good. |
|  | 7.25 | 7.20 | ....do.... | Do. |
|  | 7.50 | 7.37 | ....do.... | Do. |
|  | 7.75 | 7.52 | ....do.... | Do. |
|  | 8.00 | 7.61 | ....do.... | Do. |
|  | 8.50 | 7.91 | Acceptable | Watery, mushy, pasty, and gelatinous. |
|  | 9.00 | 8.23 | ....do.... | Do. |
| 0.3% Sodium Tetrametaphosphate. | 6.7 | 7.05 | Unacceptable | Good. |
|  | 7.25 | 7.51 | ....do.... | Watery, mushy, pasty, and gelatinous. |
|  | [1] 7.50 | 7.71 | ....do.... | Do. |
|  | 7.75 | 7.91 | ....do.... | Do. |
|  | 8.00 | 8.20 | ....do.... | Do. |
|  | 8.50 | 8.47 | ....do.... | Do. |
|  | 9.00 | 8.88 | ....do.... | Do. |

[1] No adjustment.

TABLE III

| Phosphate Compound | pH Adjustments | pH After Thawing | Color of Scrambled Eggs | Texture |
|---|---|---|---|---|
| 0.7% Sodium Hexametaphosphate. | 6.70 | 7.01 | Best | Good. |
|  | 7.25 | 7.50 | ....do.... | Do. |
|  | 7.50 | 7.72 | Acceptable | Watery, mushy, pasty and gelatinous. |
|  | 7.75 | 7.91 | ....do.... | Do. |
|  | 8.00 | 8.18 | Unacceptable | Do. |
|  | 8.50 | 8.50 | ....do.... | Do. |
|  | 9.00 | 8.88 | ....do.... | Do. |
| 0.5% Sodium tri-polyphosphate | 6.70 | 6.98 | Best | Good. |
|  | 7.25 | 7.51 | ....do.... | Do. |
|  | 7.50 | 7.75 | ....do.... | Do. |
|  | 7.75 | 7.92 | ....do.... | Watery, mushy, pasty and gelatinous. |
|  | 8.00 | 8.22 | ....do.... | Do. |
|  | 8.50 | 8.54 | Acceptable | Do. |
|  | 9.00 | 8.98 | ....do.... | Do. |
| Control Whole Egg | [1] 7.45 | 7.57 | Unacceptable | Good. |

[1] No adjustment.

What is claimed is:

1. An egg composition comprising a mixture of egg yolk and egg white and a small amount of a soluble phosphorous compound, said composition being at a pH wherein the phosphorous compound is effective to impart a fresh egg-like color to said composition but insufficient to substantially affect the normal coagulation characteristics of the composition.

2. A composition as defined in claim 1, wherein the composition is a liquid egg composition and has a pH of about 5.5 to 7.0.

3. A composition as defined in claim 2, wherein the liquid egg composition is whole eggs.

4. An egg composition as defined in claim 3, wherein the phosphorous compound is orthophosphoric acid and the pH is from about 6.40 to about 6.60.

5. An egg composition as defined in claim 2, wherein the phosphorous compound is an edible acid salt of an acid of phosphorus.

6. An egg composition as defined in claim 5, wherein the acid salt is monosodium phosphate monohydrate in an amount from about 0.3 to 0.7 percent by weight of the egg composition.

7. An egg composition as defined in claim 6, wherein the amount of monosodium phosphate monohydrate is about 0.5 percent by weight of the egg composition.

8. An egg composition as defined in claim 5, wherein the acid salt is sodium acid pyrophosphate in an amount from about 0.3 to 0.4 percent by weight of the egg composition.

9. An egg composition as defined in claim 5, wherein the acid salt is monocalcium phosphate in an amount from about 0.3 to 0.4 percent by weight of egg composition.

10. An egg composition as defined in claim 1, wherein the egg composition is a scrambled egg composition.

11. An egg composition as defined in claim 10, wherein the egg composition is a whole egg scrambled egg composition.

12. An egg composition as defined in claim 11, wherein the whole egg scrambled egg composition is prepared from a liquid whole egg composition having a pH of about 5.5 to about 7.

13. An egg composition as defined in claim 11, wherein the whole egg scrambled egg composition is prepared from a liquid egg composition having a pH of about 5.5 to about 8.25 and the phosphorous compound is monosodium phosphate.

14. An egg composition as defined in claim 11, wherein the whole egg scrambled egg composition is prepared from a liquid egg composition having a pH of about 5.5 to about 7.5 and the phosphorous compound is sodium hexametaphosphate.

15. An egg composition as defined in claim 11, wherein the whole egg scrambled egg composition is prepared from a liquid egg composition having a pH of from about 5.5 to about 7.7 and the phosphorous compound is sodium tripolyphosphate.

16. An egg composition as defined in claim 11, wherein the scrambled egg composition is prepared from the liquid egg composition defined in claim 2.

17. An egg composition as defined in claim 2, wherein the phosphorous compound is monopotassium phosphate.

18. An egg composition as defined in claim 3, wherein the phosphorous compound is monopotassium phosphate.

No references cited.

LIONEL M. SHAPIRO, *Primary Examiner.*